US009746723B2

(12) United States Patent
Yang et al.

(10) Patent No.: US 9,746,723 B2
(45) Date of Patent: Aug. 29, 2017

(54) LIQUID CRYSTAL DISPLAY DEVICE

(71) Applicant: Samsung Display Co., Ltd., Yongin-si, Gyeonggi-Do (KR)

(72) Inventors: Gunwoo Yang, Jinju-si (KR); Keunwoo Kim, Seongnam-si (KR); Youngseung Kim, Yongin-si (KR); Sooyoung Park, Seoul (KR); Kichan Jeon, Anyang-si (KR); Munsoo Park, Suwon-si (KR)

(73) Assignee: Samsung Display Co., Ltd., Samsung-ro, Gibeung-Gu, Yongin-si, Gyeonggi-Do (KR)

( * ) Notice: Subject to any disclaimer, the term of this patent is extended or adjusted under 35 U.S.C. 154(b) by 42 days.

(21) Appl. No.: 14/836,601

(22) Filed: Aug. 26, 2015

(65) Prior Publication Data
US 2016/0216570 A1    Jul. 28, 2016

(30) Foreign Application Priority Data
Jan. 26, 2015 (KR) .......... 10-2015-0012194

(51) Int. Cl.
*G02F 1/1343* (2006.01)
*G02F 1/1368* (2006.01)
*G02F 1/1337* (2006.01)

(52) U.S. Cl.
CPC ...... *G02F 1/134309* (2013.01); *G02F 1/1368* (2013.01); *G02F 1/133707* (2013.01);
(Continued)

(58) Field of Classification Search
CPC ............... G02F 1/1368; G02F 1/13624; G02F 2001/134345
(Continued)

(56) References Cited

U.S. PATENT DOCUMENTS 7,868,962 B2   1/2011   Chang et al.
7,876,389 B2   1/2011   Kim et al.
(Continued)

FOREIGN PATENT DOCUMENTS

KR   10-2010-0052645 A   5/2010
KR   10-2013-0027370 A   3/2013
KR   10-2013-0104521 A   9/2013

OTHER PUBLICATIONS

"Two-Transistor Active Pixel Sensor Readout Circuits in Amorphous Silicon Technology for High-Resolution Digital Imaging Applications", Farhad Taghibakhsh et al., IEEE Transactions on Electron Devices, vol. 55, No. 8, Aug. 2008.
(Continued)

*Primary Examiner* — Thanh-Nhan P Nguyen
(74) *Attorney, Agent, or Firm* — Robert E. Bushnell, Esq.

(57) ABSTRACT

A liquid crystal display (LCD) device improves an aperture ratio and stabilizing a storage voltage, including a first substrate; a second substrate opposed to the first substrate; a liquid crystal layer between the first substrate and the second substrate; a gate line and a data line on the first substrate; a semiconductor layer overlapping the gate line; a first drain electrode overlapping the gate line and the semiconductor layer and connected to the data line; a first source electrode overlapping the gate line and the semiconductor layer; a first sub-pixel electrode connected to the first source electrode; a second drain electrode overlapping the gate line and the semiconductor layer and connected to the first drain electrode; a second source electrode overlapping the gate line and the semiconductor layer; and a second sub-pixel electrode connected to the second source electrode. The second source electrode overlaps the gate line more than the first source electrode does.

20 Claims, 9 Drawing Sheets

(52) U.S. Cl.
 CPC ............ *G02F 2001/134345* (2013.01); *G02F 2201/40* (2013.01)

(58) Field of Classification Search
 USPC ............................................ 349/43, 48, 144
 See application file for complete search history.

(56) References Cited

U.S. PATENT DOCUMENTS

| | | |
|---|---|---|
| 9,086,601 B2 | 7/2015 | Jeong et al. |
| 2010/0208157 A1* | 8/2010 | Kwon ................ G02F 1/136286 349/48 |
| 2013/0057813 A1* | 3/2013 | Jeong ................ G02F 1/134309 349/110 |
| 2013/0242239 A1 | 9/2013 | Chang et al. |

OTHER PUBLICATIONS

"Pixel Circuits and Driving Methods for Low-Cost LCD TV", Byong-Deok Choi et al., IEEE Transactions on Consumer Electronics, vol. 50, No. 4, Nov. 2004.

* cited by examiner

LIQUID CRYSTAL DISPLAY DEVICE

CLAIM OF PRIORITY

This application claims the priority to and all the benefits accruing under 35 U.S.C. §119 of Korean Patent Application No. 10-2015-0012194, filed on Jan. 26, 2015, with the Korean Intellectual Property Office (KIPO), the disclosure of which is incorporated herein in its entirety by reference.

BACKGROUND OF THE INVENTION

1. Field of Disclosure

Embodiments of the present invention relate to a liquid crystal display (LCD) device capable of improving an aperture ratio and stabilizing a storage voltage.

2. Description of the Related Art

An LCD device is a type of flat panel displays (FPDs), which is most widely used these days. The LCD device includes two substrates including electrodes formed thereon and a liquid crystal layer interposed therebetween. Upon applying voltage to two electrodes, liquid crystal molecules of the liquid crystal layer are rearranged, thereby adjusting an amount of transmitted light.

In order to improve visibility, each pixel may include two individual sub-pixel electrodes. In this case, data signals each having different levels need to be applied to the respective sub-pixel electrodes. To this end, a data signal is applied to a sub-pixel electrode without modulation, while the data signal is divided and applied to another sub-pixel electrode. Thus, the pixel may include a voltage dividing transistor.

However, the voltage dividing transistor may cause the following disadvantages.

That is, the voltage dividing transistor may occupy a part of a pixel region, thus decreasing an aperture ratio of the pixel. Further, in a case where the voltage dividing transistor is turned on, a data line and a storage electrode may be electrically connected, such that a storage voltage of the storage electrode may be subject to variation due to a data signal.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY OF THE INVENTION

Aspects of embodiments of the present invention are directed to a liquid crystal display (LCD) device capable of increasing an aperture ratio of a pixel and efficiently reducing (i.e., minimizing) storage voltage variation.

An LCD device is a type of flat panel displays (FPDs), which is most widely used these days. The LCD device includes two substrates including electrodes formed thereon and a liquid crystal layer interposed therebetween. Upon applying voltage to two electrodes, liquid crystal molecules of the liquid crystal layer are rearranged, thereby adjusting an amount of transmitted light.

In order to improve visibility, each pixel may include two individual sub-pixel electrodes. In this case, data signals each having different levels need to be applied to the respective sub-pixel electrodes. To this end, a data signal is applied to a sub-pixel electrode without modulation, while the data signal is divided and applied to another sub-pixel electrode. Thus, the pixel may include a voltage dividing transistor.

However, the voltage dividing transistor may cause the following disadvantages. That is, the voltage dividing transistor may occupy a part of a pixel region, thus decreasing an aperture ratio of the pixel. Further, in a case where the voltage dividing transistor is turned on, a data line and a storage electrode may be electrically connected, such that a storage voltage of the storage electrode may be subject to variation due to a data signal.

According to an exemplary embodiment, an LCD device includes a first substrate; a second substrate opposed to the first substrate; a liquid crystal layer between the first substrate and the second substrate; a gate line and a data line on the first substrate; a semiconductor layer overlapping the gate line; a first drain electrode overlapping the gate line and the semiconductor layer and connected to the data line; a first source electrode overlapping the gate line and the semiconductor layer; a first sub-pixel electrode connected to the first source electrode; a second drain electrode overlapping the gate line and the semiconductor layer and connected to the first drain electrode; a second source electrode overlapping the gate line and the semiconductor layer; and a second sub-pixel electrode connected to the second source electrode. The second source electrode overlaps the gate line more than the first source electrode does.

The second source electrode may overlap the gate line more than the first source electrode does by about 10% to about 50%.

The gate line may include an electrode portion and a line portion, each having different line widths.

The first drain electrode may overlap the electrode portion.

The second drain electrode may overlap the electrode portion.

The first source electrode may overlap the electrode portion.

The second source electrode may overlap the electrode portion and the line portion.

The second source electrode may overlap the electrode portion, and the second sub-pixel electrode may overlap the line portion.

The electrode portion may have a line width greater than that of the line portion.

The first drain electrode and the second drain electrode may each have a U-shape.

A curved portion of the first drain electrode may be opposed to the second sub-pixel electrode, and a curved portion of the second drain electrode may be opposed to the first sub-pixel electrode.

A curved portion of the first drain electrode may be opposed to the second sub-pixel electrode, and a curved portion of the second drain electrode may be opposed to a lateral surface of the first drain electrode.

A curved portion of the first drain electrode and a curved portion of the second drain electrode may be opposed to the second sub-pixel electrode.

The LCD device may further include a first storage electrode overlapping the first sub-pixel electrode.

The LCD device may further include a second storage electrode overlapping the second sub-pixel electrode.

The first sub-pixel electrode may have the same size as a size of the second sub-pixel electrode.

The first sub-pixel electrode may include a first stem electrode; and a first branch electrode extending from the first stem electrode.

The second sub-pixel electrode may include a second stem electrode; and a second branch electrode extending from the second stem electrode.

The second source electrode is arranged in a direction not parallel with the first source electrode.

According to embodiments of the present invention, an LCD device may have the following effects.

First, a level of a data signal applied to a second sub-pixel electrode may be adjusted only with a parasitic capacitor, despite the absence of an additional voltage dividing transistor which is provided in a conventional display device. Accordingly, an aperture ratio of a pixel may increase. Further, since the level of the data signal is adjusted by capacitance of a parasitic capacitor, not by internal resistance of a transistor, the level of the data signal can be more easily controlled.

Second, since a voltage dividing transistor is not used as described hereinabove, the data line and a storage electrode may not be connected directly. Accordingly, variation in a storage voltage can be efficiently reduced (i.e., minimized).

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
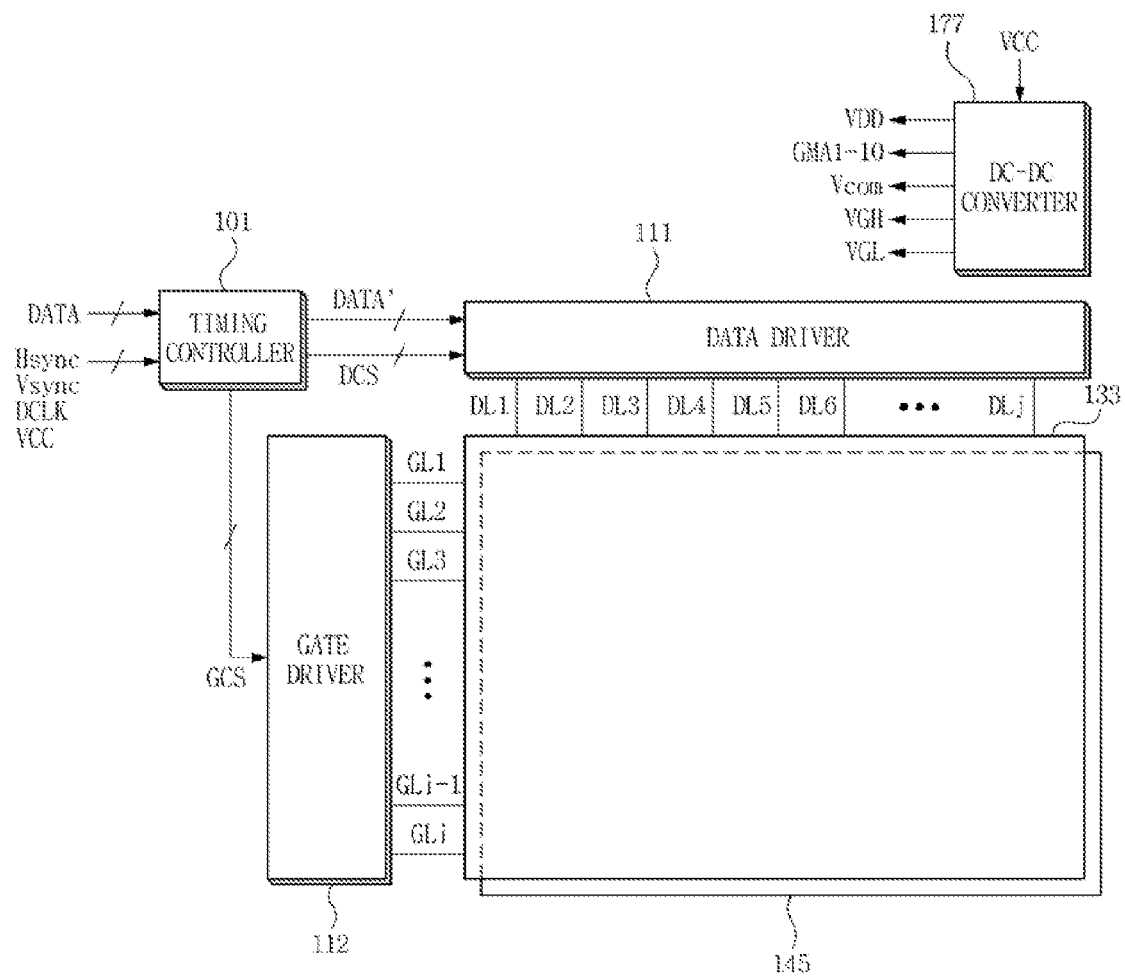
FIG. 1 is a block diagram illustrating a liquid crystal display (LCD) device according to an exemplary embodiment.

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification.

In the drawings, thicknesses are illustrated in an enlarged manner in order to clearly describe a plurality of layers and areas. Like reference numbers are used to denote like elements throughout the specification. When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on", "directly engaged to", "directly connected to" or "directly coupled to" another element or layer, there may be no intervening elements or layers present. Other words used to describe the relationship between elements should be interpreted in a like fashion (e.g., "between" versus "directly between", "adjacent" versus "directly adjacent", etc.). As used herein, the term "and/or" includes any and all combinations of one or more of the associated listed items.

The spatially related terms "below", "beneath", "lower", "above", "upper", and the like, may be used herein for ease of description to describe the relations between one element or component and another element or component as illustrated in the drawings. It will be understood that the spatially related terms are intended to encompass different orientations of the device in use or operation, in addition to the orientation depicted in the drawings. For example, in a case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially related terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises", "comprising", "includes" and/or "including", when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first", "second", "third", and the like may be used herein to describe various elements, these elements should not be limited by these terms. These terms are only used to distinguish one element from another element. Thus, "a first element" discussed below could be termed "a second element" or "a third element", and "a second element" and "a third element" can be termed likewise without departing from the teachings herein.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

An LCD device is a type of flat panel displays (FPDs), which is most widely used these days. The LCD device includes two substrates including electrodes formed thereon and a liquid crystal layer interposed therebetween. Upon applying voltage to two electrodes, liquid crystal molecules of the liquid crystal layer are rearranged, thereby adjusting an amount of transmitted light.

In order to improve visibility, each pixel may include two individual sub-pixel electrodes. In this case, data signals each having different levels need to be applied to the respective sub-pixel electrodes. To this end, a data signal is applied to a sub-pixel electrode without modulation, while the data signal is divided and applied to another sub-pixel electrode. Thus, the pixel may include a voltage dividing transistor.

However, the voltage dividing transistor may cause the following disadvantages. That is, the voltage dividing transistor may occupy a part of a pixel region, thus decreasing an aperture ratio of the pixel. Further, in a case where the voltage dividing transistor is turned on, a data line and a storage electrode may be electrically connected, such that a storage voltage of the storage electrode may be subject to variation due to a data signal.

Figure 2:
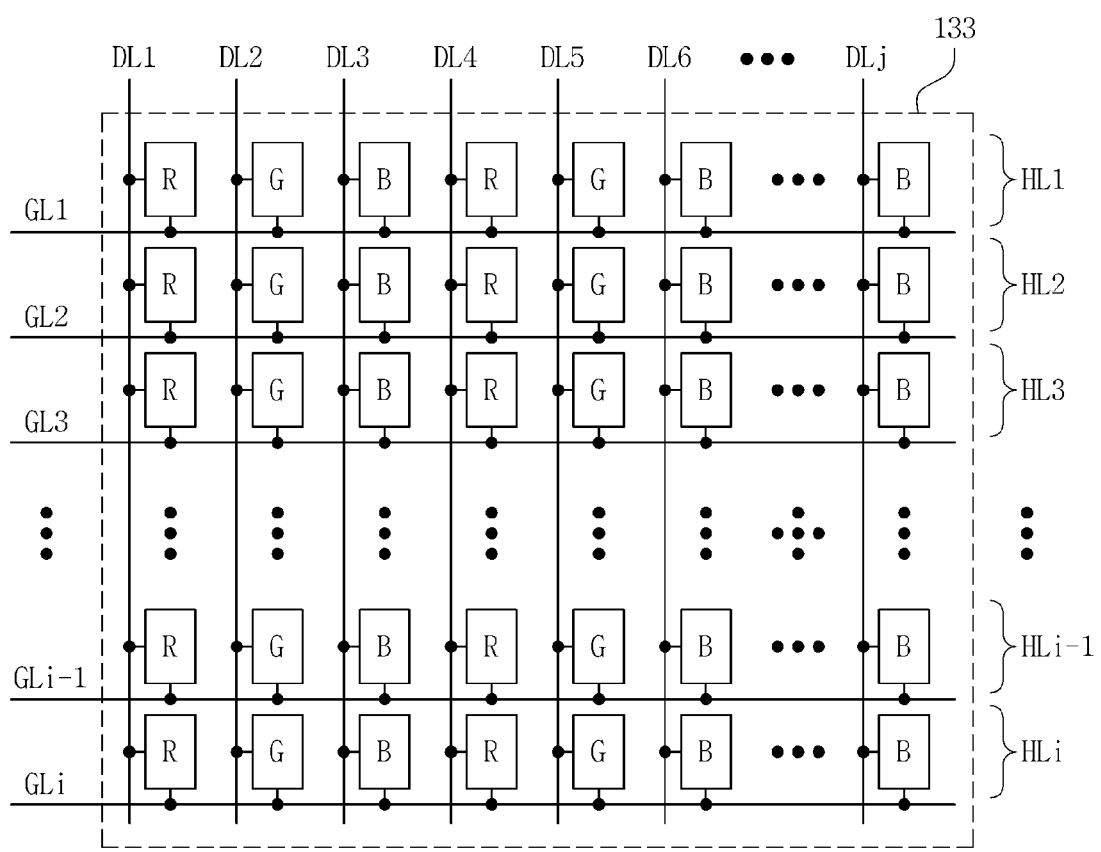
FIG. 2 is a detailed configuration view illustrating a display panel of FIG. 1.

FIG. 1 is a block diagram illustrating a liquid crystal display (LCD) device according to an exemplary embodiment, and FIG. 2 is a detailed configuration view illustrating a display panel of FIG. 1.

The LCD device according to an exemplary embodiment, as illustrated in FIG. 1, may include a display panel 133, a timing controller 101, a gate driver 112, a data driver 111, a backlight unit 145, and a direct current (DC)-DC converter 177.

The display panel 133 may display images. The display panel 133 may include a liquid crystal layer (333 of FIG. 5); and a first substrate (301 of FIG. 5) and a second substrate (302 of FIG. 5) that face each other with the liquid crystal layer 333 interposed therebetween.

On the respective surfaces of the first and second substrates 301 and 302 that face each other, the following elements may be disposed, which will be described further below in detail.

On the first substrate 301, as illustrated in FIG. 2, a plurality of gate lines GL1 through GLi, a plurality of data lines DL1 through DLj intersecting the gate lines GL1 through GLi, and a plurality of thin film transistors (TFT of FIG. 3) connected to the gate lines GL1 through GLi and the data lines DL1 through DLj are disposed.

Meanwhile, a plurality of color filters (354 of FIG. 5) may be further disposed on the first substrate 301 and a black matrix (376 of FIG. 5) may be disposed on the second substrate 302. The black matrix 376 may be disposed on an area of the second substrate 301, that is, other than an area corresponding to a pixel region (P of FIG. 3) of the display panel 133. The color filters 354 may be disposed on the pixel region P. The color filters 354 may be classified into a red color filter, a green color filter, and a blue color filter.

Meanwhile, the color filters 354 may be disposed on the second substrate 302, instead of being disposed on the first substrate 301. Further, the black matrix 376 may be disposed on the first substrate 301, instead of being disposed on the second substrate 302. For example, the color filters 354 may be disposed on the second substrate 302, corresponding to the pixel region P, and the black matrix 376 may be disposed on an area of the first substrate 301, that is, other than an area corresponding to the pixel region P of the display panel 133.

Pixels R, G, and B may be arranged in a matrix form. The pixels R, G, and B may be classified into red pixels R configured to display a red image, green pixels G configured to display a green image, and blue pixels B configured to display a blue image. The red pixel R may include a red color filter, the green pixel G may include a green color filter, and the blue pixel B may include a blue color filter. In this case, red, green, and blue pixels R, G, and B adjacently disposed in a horizontal direction may form a unit pixel to display a unit image.

A common electrode (330 of FIG. 5) is provided on the second substrate 302. The common electrode 330 may be formed over the entire surface of the second substrate 302. The common electrode 330 may externally receive a common voltage.

Meanwhile, an overcoat layer (722 of FIG. 5) may be further disposed between the common electrode 330 and the black matrix.

There may be j pixels arranged along an $n^{th}$ (n is a number selected from 1 to i) horizontal line (hereinafter, $n^{th}$ horizontal line pixels) respectively connected to the first through $j^{th}$ data lines DL1 through DLj. Further, the $n^{th}$ horizontal line pixels may be connected to the $n^{th}$ gate line together. Accordingly, the $n^{th}$ horizontal line pixels may receive an $n^{th}$ gate signal together. That is, j pixels arranged in the same horizontal line may receive the same gate signal, while pixels arranged in different horizontal lines may receive different gate signals. For example, both red and green pixels R and G disposed on the first horizontal line HL1 may receive a first gate signal, while red and green pixels R and G disposed on the second horizontal line HL2 may receive a second gate signal, which has a timing different from a timing of the first gate signal.

The timing controller 101, although not illustrated, may receive a vertical synchronization signal Vsync, a horizontal synchronization signal Hsync, an image data signal DATA, and a clock signal DCLK output from a graphic controller provided in a system. An interface circuit (not illustrated) may be provided between the timing controller 101 and the system, and the signals output from the system may be input to the timing controller 101 via the interface circuit. The interface circuit may be equipped in the timing controller 101.

Although not illustrated, the interface circuit may include a low voltage differential signaling (LVDS) receiver. The interface circuit may lower voltage levels of the vertical synchronization signal Vsync, the horizontal synchronization signal Hsync, the image data signal DATA, and the clock signal DCLK output from the system, but may increase frequencies thereof.

Meanwhile, due to a high-frequency component of the signal input from the interface circuit to the timing controller 101, electromagnetic interference (EMI) may be caused therebetween. In order to prevent the interference, an EMI filter (not illustrated) may further be provided between the interface circuit and the timing controller 101.

The timing controller 101 may generate a gate control signal for controlling the gate driver 112 and a data control signal for controlling the data driver 111, based on the vertical synchronization signal Vsync, the horizontal synchronization signal Hsync, and the clock signal DCLK. The gate control signal may include a gate start pulse, a gate shift clock, a gate output enable signal, and the like. The data control signal may include a source start pulse, a source shift clock, a source output enable signal, a polarity signal, and the like.

Further, the timing controller 101 may rearrange image data signals DATA input through a system and supply the rearranged image data signals DATA' to the data driver 111.

Meanwhile, the timing controller 101 may be operated by a driving power VCC output from a power unit provided in the system. In particular, the driving power VCC is used as a power voltage of a phase lock loop PLL equipped inside the timing controller 101. The phase lock loop PLL may compare the clock signal DCLK input to the timing controller 101 with a reference frequency generated by an oscillator. In a case where there is a difference between the compared values, the phase lock loop PPL may adjust the frequency of the clock signal by the difference to thereby produce a sampling clock signal. The sampling clock signal is a signal used to perform sampling of the image data signals DATA'.

The DC-DC converter 177 may increase or decrease the driving power VCC input through the system to thereby produce voltages required for the display panel 133. To this end, the DC-DC converter 177 may include, for example, an output switching element for switching an output voltage of an output terminal thereof; and a pulse width modulator PWM for adjusting a duty ratio or a frequency of a control signal applied to a control terminal of the output switching element so as to increase or decrease the output voltage. Herein, the DC-DC converter 177 may include a pulse frequency modulator PFM, in lieu of the pulse width modulator PWM.

The pulse width modulator PWM may increase a duty ratio of the aforementioned control signal to increase the output voltage of the DC-DC converter 177 or decrease the duty ratio of the control signal to lower the output voltage thereof. The pulse frequency modulator PFM may increase a frequency of the aforementioned control signal to increase the output voltage of the DC-DC converter 177 or decrease the frequency of the control signal to lower the output voltage thereof. The output voltage of the DC-DC converter 177 may include a reference voltage VDD of greater than or equal to about 6 [V], a gamma reference voltage GMA1-10 of less than level 10, a common voltage in a range of about 2.5 [V] to about 3.3 [V], a gate high voltage of greater than or equal to about 15 [V], and a gate low voltage of less than or equal to about −4 [V].

The gamma reference voltage GMA1-10 is a voltage generated through voltage division of the reference voltage. The reference voltage and the gamma reference voltage may be analog gamma voltages, and they may be provided to the data driver 111. The common voltage may be applied to the common electrode 330 of the display panel 133 via the data driver 111. The gate high voltage is a high logic voltage of the gate signal, which is set to be more than or equal to a threshold voltage of the thin film transistor TFT. Further, the gate low voltage is a low logic voltage of the gate signal, which is set to be an off voltage of the thin film transistor TFT. The gate high voltage and the gate low voltage may be applied to the gate driver 112.

The gate driver 112 may generate gate signals according to the gate control signal GCS applied from the timing controller 101 and may sequentially apply the gate signals to the plurality of gate lines GL1 through GLi. The gate driver 112 may include, for example, a shift register configured to shift the gate start pulse to generate the gate signals based on the gate shift clock. The shift register may include a plurality of switching elements. The switching elements may be formed on the first substrate 301 through the same process as a process used to form the thin film transistor TFT in a display area.

The data driver 111 may receive the image data signals DATA' and the data control signal DCS from the timing controller 101. The data driver 111 may perform sampling of the image data signals DATA' according to the data control signal DCS, perform latching of the sampled image data signals corresponding to a horizontal line each horizontal period, and apply the latched image data signals to the data lines DL1 through DLj. That is, the data driver 111 may convert the image data signals DATA' applied from the timing controller 101 into analog image data signals using the gamma reference voltages GMA1-10 input from the DC-DC converter 177 and may provide them to the data lines DL1 through DLj.

The backlight unit 145 may provide light to the display panel 133. To this end, the backlight unit 145 may include a plurality of light source arrays. Herein, each light source array may include at least one light source, which may be a light emission package including at least one light emitting diode (LED).

Figure 3:
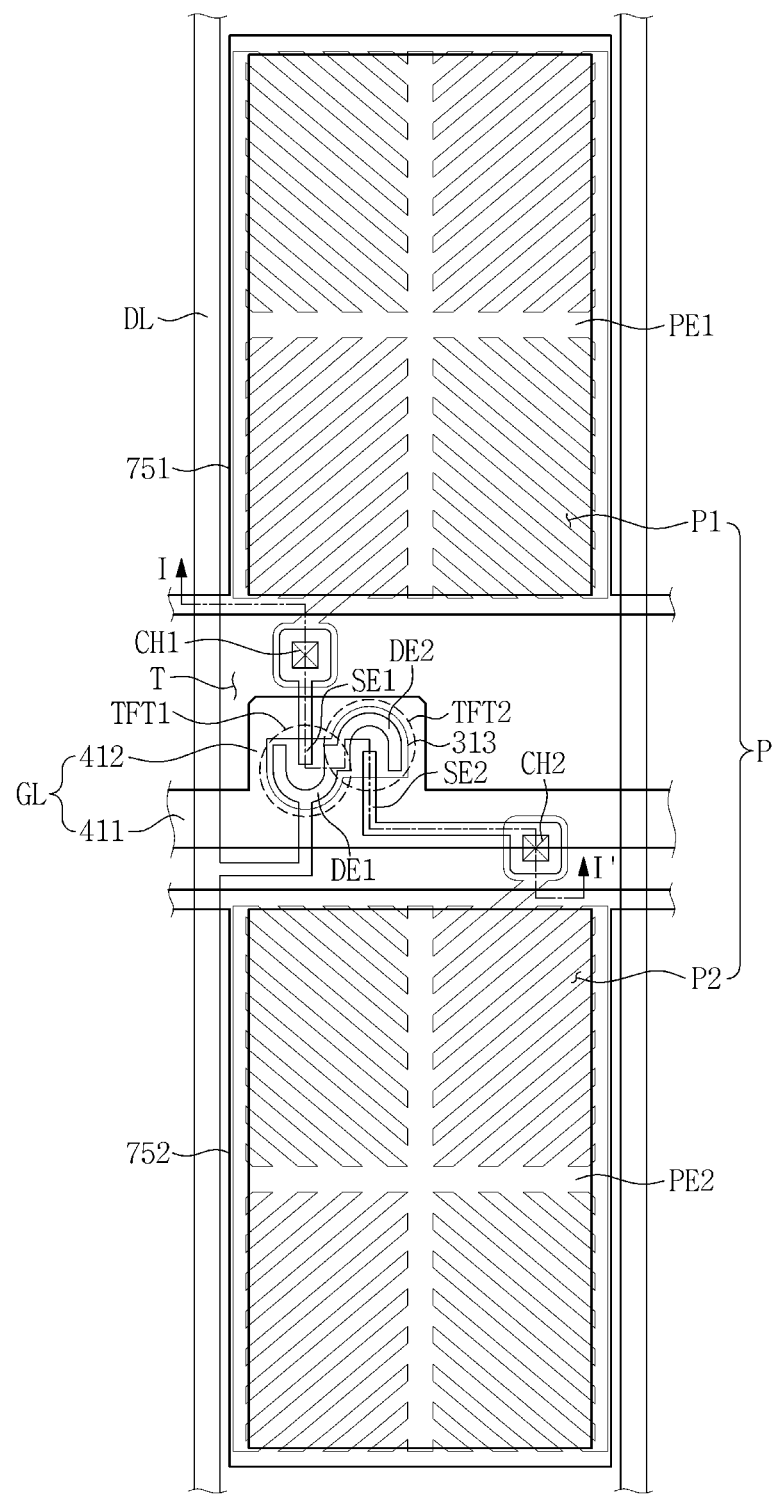
FIG. 3 is a detailed configuration view illustrating a pixel of FIG. 2.
Figure 4:
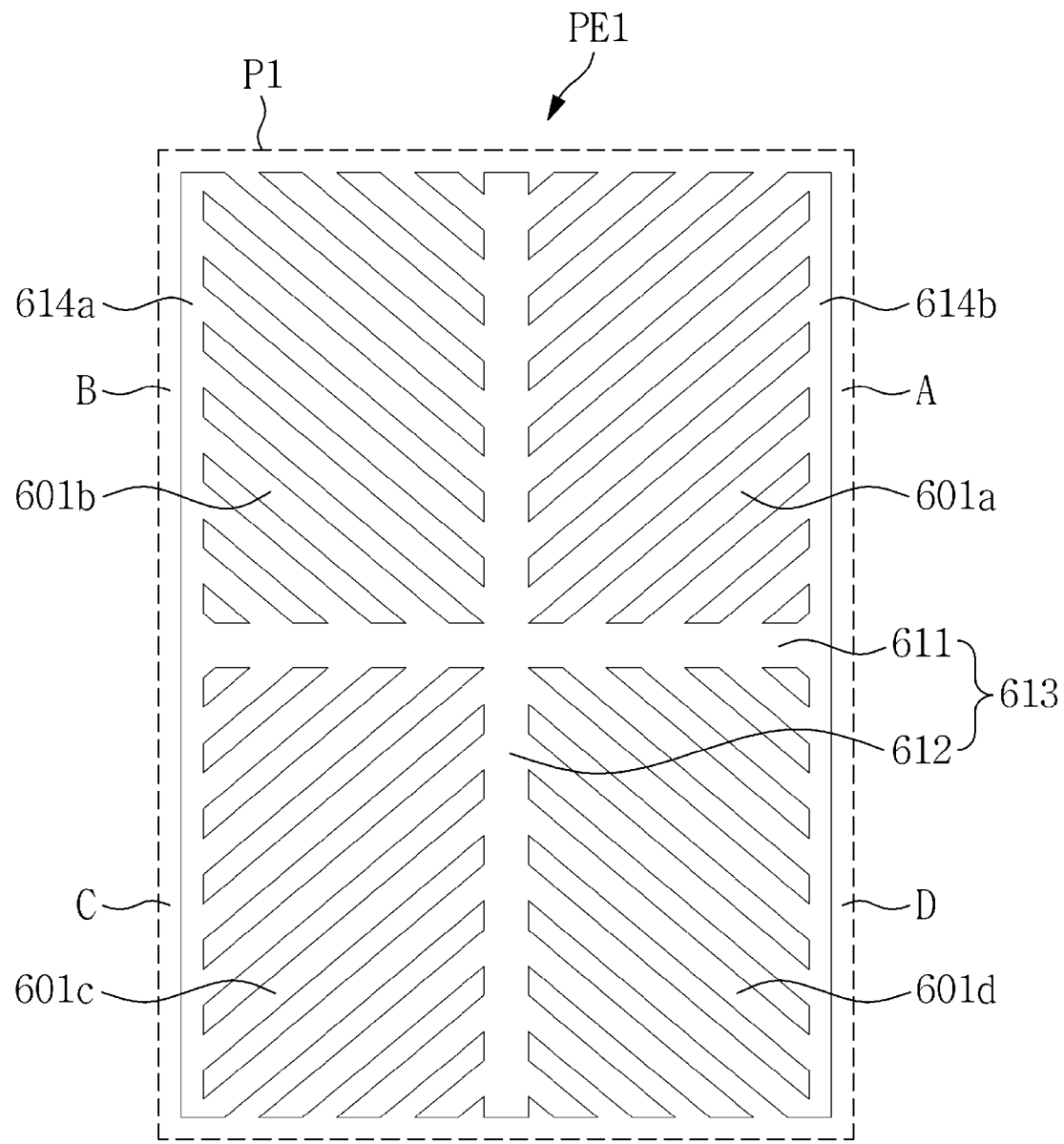
FIG. 4 is a view illustrating a first sub-pixel electrode of FIG. 3.
Figure 5:
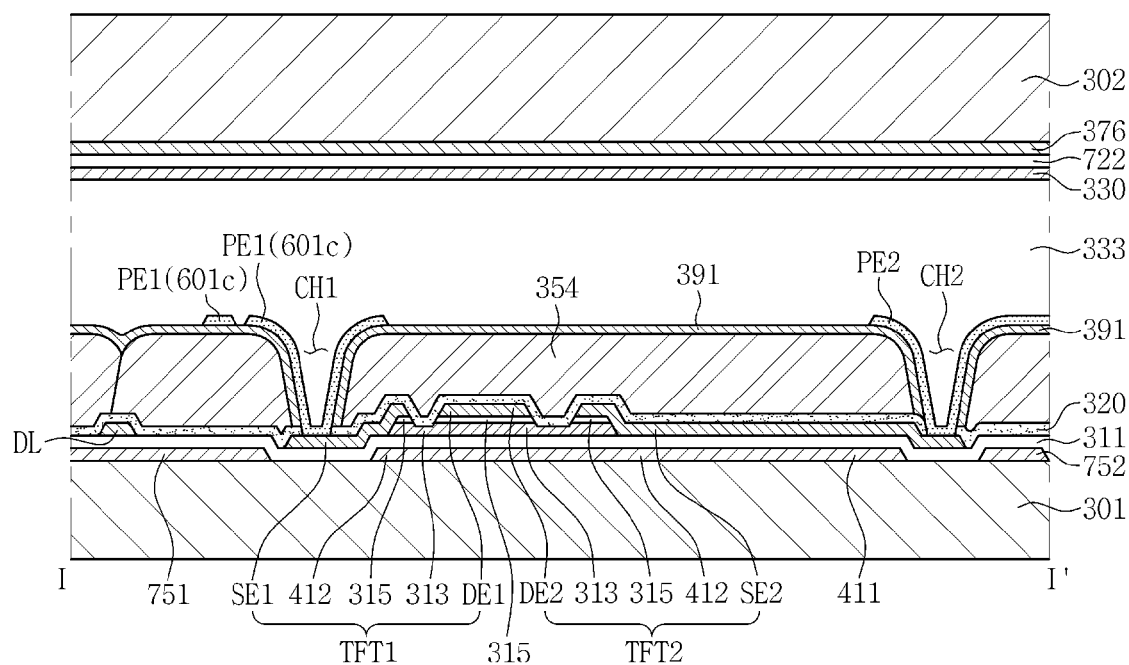
FIG. 5 is a cross-sectional view taken along line I-I' of FIG. 3.

FIG. 3 is a detailed configuration view illustrating a pixel of FIG. 2. FIG. 4 is a view illustrating a first sub-pixel electrode of FIG. 3. FIG. 5 is a cross-sectional view taken along line I-I' of FIG. 3.

Each pixel, as illustrated in FIGS. 3 through 5, may include a first thin film transistor TFT1, a second thin film transistor TFT2, a first storage electrode 751, a second storage electrode 752, the color filter 354, a first sub-pixel electrode PE1, a second sub-pixel electrode PE2, the common electrode 330, and the liquid crystal layer 333. Herein, the first thin film transistor TFT1, as illustrated in FIGS. 3 and 5, may include a gate electrode 412, a semiconductor layer 313, a first drain electrode DE1, and a first source electrode SE1. Further, the second thin film transistor TFT2, as illustrated in FIGS. 3 and 5, may include a gate electrode 412, a semiconductor layer 313, a second drain electrode DE2, and a second source electrode SE2.

Meanwhile, the common electrode 330 of the respective pixels may be integrally formed and the liquid crystal layer 333 of the respective pixels may be integrally formed.

As illustrated in FIGS. 3 and 5, the gate line GL is disposed on the first substrate 301. For example, the gate line GL may be disposed on a transistor area T of the first substrate 301. The transistor area T may be positioned between a first sub-pixel region P1 and a second sub-pixel region P2. The gate line GL may include a line unit 411 and an electrode unit 412, each having different line widths. For example, the electrode unit 412 may have a greater line width than that of the line unit 411. The line unit 411 and the electrode unit 412 may be integrally formed. The electrode unit 412 may be a gate electrode of each of the aforementioned first and second thin film transistors TFT1 and TFT2. Meanwhile, although not illustrated, the gate line GL may have a connecting portion (e.g., an end portion) greater than other portions thereof in size, so as to be properly connected to another layer or external driving circuits. The gate line GL may include at least one metal of aluminum (Al) or alloys thereof, silver (Ag) or alloys thereof, copper (Cu) or alloys thereof, and/or molybdenum (Mo) or alloys thereof. Further, the gate line GL may include one of chromium (Cr), tantalum (Ta), and titanium (Ti). In some embodiments, the gate line GL may have a multi-layer structure including at least two conductive layers, each having different physical properties.

The first storage electrode 751 may enclose the first sub-pixel electrode PE1 In this case, the first storage electrode 751 may overlap an edge portion of the first sub-pixel electrode PE1 The first storage electrode 751 may be made of the same material and may have the same structure (a multi-layer structure) as in the gate line GL. In other words, the gate line GL and the first storage electrode 751 may be simultaneously formed in the same process. A storage voltage may be applied to the first storage electrode 751. The storage voltage may have a voltage level equivalent to that of the common voltage.

The second storage electrode 752 may enclose the second sub-pixel electrode PE2. In this case, the second storage electrode 752 may overlap an edge portion of the second sub-pixel electrode PE2. The second storage electrode 752 may be made of the same material and may have the same structure (a multi-layer structure) as in the gate line GL. In other words, the gate line GL and the second storage electrode 752 may be simultaneously formed in the same process. A storage voltage may be applied to the second storage electrode 752. The storage voltage may have a voltage level equivalent to that of the common voltage. Meanwhile, the second storage electrode 752 and the first storage electrode 751 may be integrally formed together.

A gate insulating layer 311 is disposed on the gate line GL, the first storage electrode 751, and the second storage electrode 752. In this case, the gate insulating layer 311 may be formed over the entire surface of the first substrate 301 including the gate line GL, the first storage electrode 751, and the second storage electrode 752. The gate insulating layer 311 may be formed of, for example, silicon nitride ($SiN_x$), silicon oxide ($SiO_x$), and the like. The gate insulating layer 311 may have a multi-layer structure including at least two insulating layers, each having different physical properties.

The semiconductor layer 313 is disposed on the gate insulating layer 311. In this case, the semiconductor layer 313 may at least partially overlap the electrode unit 412 of the gate line GL, that is, the gate electrode 412. The semiconductor layer 313 may be formed of amorphous silicon, polycrystalline silicon, or the like.

An ohmic contact layer 315 may be disposed on the semiconductor layer 313. The ohmic contact layer 315 may include silicide or n+ hydrogenated amorphous silicon doped with n-type impurities, such as phosphorus, at high concentration. The ohmic contact layer 315 may be disposed on the semiconductor layer 313 in pairs.

The first drain electrode DE1 and the first source electrode SE1 provided in the first thin film transistor TFT1 and the second drain electrode DE2 and the second source electrode SE2 provided in the second thin film transistor TFT2 may be disposed on the ohmic contact layer 315.

The first drain electrode DE1 may extend from the data line DL and as illustrated in FIG. 3, may have a shape protruding toward the gate electrode 412. In this case, the first drain electrode DE1 may have a shape partially enclosing the first source electrode SE1. A part of the first drain electrode DE1 may overlap the semiconductor layer 313 and the gate electrode 412. In this case, another part of the first drain electrode DE1 may further overlap the line unit 411. The first drain electrode DE1 may be provided in one of a C-shape, an inverted C-shape, a U-shape, and an inverted U-shape. FIG. 3 illustrates the first drain electrode DE1 having a U-shape, and a curved portion of the first drain electrode DE1 may be opposed to the second sub-pixel electrode PE2.

In some applications, it is desirable that the first drain electrode DE1 is made of refractory metal, such as molybdenum, chromium, tantalum and titanium, or a metal alloy thereof, and may have a multi-layer structure including a refractory metal layer and a low-resistance conductive layer. Examples of the multi-layer structure may include a double-layer structure including a chromium or molybdenum (alloy) lower layer and an aluminum (alloy) upper layer; and a triple-layer structure including a molybdenum (alloy) lower layer, an aluminum (alloy) intermediate layer, and a molybdenum (alloy) upper layer. Further, the first drain electrode DE1 may be made of various metals or conductive materials rather than the above-described materials.

One side of the first source electrode SE1 may be disposed on the gate electrode GE. One side of the first source electrode SE1 may overlap the gate electrode 412 and the semiconductor layer 313. Another side of the first source electrode SE1 may be connected to the first sub-pixel electrode PE1.

The first source electrode SE1 may also include the same material and have the same structure (a multi-layer structure) as in the first drain electrode DE1. In other words, the first source electrode SE1 and the first drain electrode DE1 may be simultaneously formed in the same process.

The gate electrode 412, the first drain electrode DE1, and the first source electrode SE1 may together constitute the first thin film transistor TFT1 along with the semiconductor layer 313 and the ohmic contact layer 315. In this case, a channel of the first thin film transistor TFT1 may be formed on a portion of the semiconductor layer 313 between the first drain electrode DE1 and the first source electrode SE1. The portion of the semiconductor layer 313 corresponding to the channel may have a thickness less than a thickness of the other portion. The first thin film transistor TFT1, as illustrated in FIG. 3, may be disposed in the transistor area T.

The second drain electrode DE2 may be electrically connected to the first drain electrode DE1. To this end, the second drain electrode DE2 and the first drain electrode DE1 may be integrally formed. The second drain electrode DE2 may have a shape partially enclosing the second source electrode SE2. At least a part of the second drain electrode DE2 may overlap the semiconductor layer 313 and the gate electrode 412. The second drain electrode DE2 may be provided in one of a C-shape, an inverted C-shape, a U-shape, and an inverted U-shape. FIG. 3 illustrates the second drain electrode DE2 having an inverted U-shape, and a curved portion of the second drain electrode DE2 may be opposed to the first sub-pixel electrode PE1.

The second drain electrode DE2 may also include the same material and have the same structure (a multi-layer structure) as in the first drain electrode DE1. In other words, the second drain electrode DE2 and the first drain electrode DE1 may be simultaneously formed in the same process.

One side of the second source electrode SE2 may be disposed on the gate electrode GE. One side of the second source electrode SE2 may overlap the gate electrode 412 and the semiconductor layer 313. Another side of the second source electrode SE2 may be connected to the second sub-pixel electrode PE2. Herein, the other part of the second source electrode SE2, except for the one side and another side of the second source electrode SE2, may overlap the line unit 411. The second source electrode SE2 may be arranged in a direction not parallel with the first source electrode SE1.

The second source electrode SE2 may also include the same material and have the same structure (a multi-layer structure) as in the first source electrode SE1. In other words, the second source electrode SE2 and the first source electrode SE1 may be simultaneously formed in the same process.

The gate electrode 412, the second drain electrode DE2, and the second source electrode SE2 may together constitute the second thin film transistor TFT2 along with the semiconductor layer 313 and the ohmic contact layer 315. In this case, a channel of the second thin film transistor TFT2 may be formed on a portion of the semiconductor layer 313 between the second drain electrode DE2 and the second source electrode SE2. The portion of the semiconductor layer 313 corresponding to the channel may have a thickness less than a thickness of the other portion. The second thin film transistor TFT2, as illustrated in FIG. 3, may be disposed in the transistor area T.

The data line DL is disposed on the gate insulating layer 311. Although not illustrated, the data line DL may have a connecting portion (e.g., an end portion) greater than other portions thereof in size, so as to be properly connected to another layer or external driving circuits.

The data line DL may extend in a longitudinal direction to intersect the gate line GL, the first storage electrode 751, and the second storage electrode 752. Although not illustrated, the data line DL may have a smaller line width in a portion where the data line DL intersects the gate line GL rather than a line width of other parts. Likewise, the data line DL may have a smaller line width in a portion where the data line DL intersects the first storage electrode 751 or the second storage electrode 752 rather than a line width of other parts. Accordingly, a parasitic capacitance between the data line DL and the gate line GL and a capacitance between the data line DL and the first storage electrode 751 or the second storage electrode 752 may decrease. The data line DL may also include the same material and have the same structure (a multi-layer structure) as in the first drain electrode DE1. In other words, the data line DL and the first drain electrode DE1 may be simultaneously formed in the same process.

A protective layer 320 is disposed on the data line DL, the first drain electrode DE1, the first source electrode SE1, the second drain electrode DE2, and the second source electrode SE2. In this case, the protective layer 320 may be formed over the entire surface of the first substrate 301 including the data line DL, the first drain electrode DE1, the first source electrode SE1, the second drain electrode DE2, and the second source electrode SE2. The protective layer 320 may be formed of, for example, inorganic insulating materials such as silicon nitride ($SiN_x$) and silicon oxide ($SiO_x$). When the protective layer 320 is made of an inorganic insulating material, an inorganic insulating material having photosensitive properties and having a dielectric constant of about 4.0 may be used. The protective layer 320 may also have a double-layer structure including a lower inorganic layer and an upper organic layer, which has been found to impart desirable insulating properties and also to prevent damage to exposed portions of the semiconductor layer 313. As examples, the protective layer 320 may have a thickness of more than or equivalent to about 5000 Å, in more particular, about 6000 Å to about 8000 Å.

The protective layer 320 may have a lower contact hole extending partially therethrough, and the first source electrode SE1 and the second source electrode SE2 may be partially exposed through the lower contact hole.

As illustrated in FIG. 5, the color filter 354 is disposed on the protective layer 320. The color filter 354 may be disposed in the first sub-pixel region P1 and the second sub-pixel region P2; in this case, an edge portion of the color filter 354 may be disposed on the gate line GL, the first thin film transistor TFT1, the second thin film transistor TFT2, and the data line DL. The color filter 354, however, may not overlap a connecting portion between the first source electrode SE1 and the first pixel electrode PE1 and a connecting portion between the second source electrode SE2 and the second pixel electrode PE2. That is, the color filter 354 may not be formed on the protective layer 350 corresponding to the connecting portions. Meanwhile, an edge portion of the color filter 354 may overlap an edge portion of another color filter 354 adjacent thereto. The color filter 354 may include photo-sensitive organic materials. Color filters of the same color may be formed in the first sub-pixel region P1 and in the second sub-pixel region P2 that constitute a single pixel region.

A capping layer 391 is disposed on the color filter 354. The capping layer 391 may prevent infiltration of impurities generated in the color filter 354. The capping layer 391 may include silicon nitride or silicon oxide. The capping layer 391 may have upper contact holes extending therethrough, and one of the upper contact holes may be disposed directly on the lower contact hole through which the first source electrode SE1 is exposed. The upper contact hole and the lower contact hole may be connected to each other to form a first source contact hole CH1. Another upper contact hole may be disposed on the lower contact hole through which the second source electrode SE2 is exposed. The upper contact hole and the lower contact hole may be connected to each other to form a second source contact hole CH2.

The first sub-pixel electrode PE1 may be formed in the first sub-pixel region P1. In this case, as illustrated in FIG. 5, the first sub-pixel electrode PE1 may be disposed on the capping layer 391. Herein, the first sub-pixel electrode PE1 will be described further hereinbelow with reference to FIG. 4.

The first sub-pixel electrode PE1 may include a stem electrode 613 and a plurality of branch electrodes 601a, 601b, 601c, and 601d. The stem electrode 613 and the branch electrodes 601a, 601b, 601c, and 601d may be integrally formed into a single unit.

The stem electrode 613 may partition the first sub-pixel region P1 into a plurality of domains. For example, the stem electrode 613 may include a horizontal portion 611 and a vertical portion 612 intersecting each other. The horizontal portion 611 may partition the first sub-pixel region P1 into two domains, and the vertical portion 612 may partition each of the divided two domains into another two smaller domains. The pixel region P may be partitioned into four domains A, B, C, and D by the stem electrode 613 including the horizontal portion 611 and the vertical portion 612.

The branch electrodes 601a, 601b, 601c, and 601d may include first through fourth branch electrodes 601a, 601b, 601c, and 601d each extending toward different directions from the stem electrode 613. In other words, the first through fourth branch electrodes 601a, 601b, 601c, and 601d may extend into each domain A, B, C, and D from the stem electrode 613. For example, the first branch electrode 601a may be disposed in the first domain A, the second branch electrode 601b may be disposed in the second domain B, the third branch electrode 601c may be disposed in the third domain C, and the fourth branch electrode 601d may be disposed in the fourth domain D.

The first branch electrode 601a and the second branch electrode 601b may form a symmetrical shape with respect to the vertical portion 612; and the third branch electrode 601c and the fourth branch electrode 601d may form a symmetrical shape with respect to the vertical portion 612. Further, the first branch electrode 601a and the fourth branch electrode 601d may form a symmetrical shape with respect to the horizontal portion 611; and the second branch electrode 601b and the third branch electrode 601c may form a symmetrical shape with respect to the horizontal portion 611.

The first branch electrodes 601a may be provided in plural in the first domain A, and in this case, the plurality of first branch electrodes 601a may be aligned parallel to each other. In this regard, a part of the first branch electrodes 601a may extend from a side of the horizontal portion 611 in contact with the first domain A in a diagonal direction with respect to the side thereof. Further, the rest of the first branch electrodes 601a may extend from a side of the vertical portion 612 in contact with the first domain A in a diagonal direction with respect to the side thereof.

The second branch electrodes 601b may be provided in plural in the second domain B, and in this case, the plurality of second branch electrodes 601b may be aligned parallel to each other. In this regard, a part of the second branch electrodes 601b may extend from a side of the horizontal portion 611 in contact with the second domain B in a diagonal direction with respect to the side thereof. Further, the rest of the second branch electrodes 601b may extend from a side of the vertical portion 612 in contact with the second domain B in a diagonal direction with respect to the side thereof.

The third branch electrodes 601c may be provided in plural in the third domain C, and in this case, the plurality of third branch electrodes 601c may be aligned parallel to each other. In this regard, a part of the third branch electrodes 601c may extend from a side of the horizontal portion 611 in contact with the third domain C in a diagonal direction with respect to the side thereof. Further, the rest of the third branch electrodes 601c may extend from a side of the vertical portion 612 in contact with the third domain C in a diagonal direction with respect to the side thereof.

The fourth branch electrodes 601d may be provided in plural in the fourth domain D, and in this case, the plurality of fourth branch electrodes 601d may be aligned parallel to each other. In this regard, a part of the fourth branch electrodes 601d may extend from a side of the horizontal portion 611 in contact with the fourth domain D in a diagonal direction with respect to the side thereof. Further, the rest of the fourth branch electrodes 601d may extend from a side of the vertical portion 612 in contact with the fourth domain D in a diagonal direction with respect to the side thereof.

Meanwhile, the aforementioned stem electrode 613 may further include a first connecting portion 614a and a second connecting portion 614b. The first connecting portion 614a may be connected to an end portion of one side of the horizontal portion 611; and the second connecting portion 614b may be connected to an end portion of another side of the horizontal portion 611. The first connecting portion 614a and the second connecting portion 614b may be aligned parallel to the vertical portion 612. The first connecting portion 614a and the second connecting portion 614b may be integrally formed along with the stem electrode 613.

End portions of a part of the first branch electrodes 601a disposed in the first domain A and end portions of a part of the fourth branch electrodes 601d disposed in the fourth domain D may be connected to each other by the second connecting portion 614b. Likewise, end portions of a part of the second branch electrodes 601b disposed in the second domain B and end portions of a part of the third branch electrodes 601c disposed in the third domain C may be connected to each other by the first connecting portion 614a.

The first sub-pixel electrode PE1 and the first storage electrode 751 may overlap each other. For example, an edge portion of the first sub-pixel electrode PE1 may be disposed on the first storage electrode 751.

The second sub-pixel electrode PE2 is disposed in the second sub-pixel region P2. In this case, as illustrated in FIG. 5, the second sub-pixel electrode PE2 may be disposed on the capping layer 391. The second sub-pixel electrode PE2 may have substantially the same structure as that of the first sub-pixel electrode PE1. That is, the second sub-pixel electrode PE2 may include a stem electrode configured to partition the second sub-pixel region into a plurality of domains and a branch electrode extending from the stem electrode into each domain. Further, the second sub-pixel electrode may further include a first connecting portion and a second connecting portion. Since the stem electrode, the branch electrode, the first connecting portion, and the second connecting portion provided in the second sub-pixel electrode are identical to those provided in the first sub-pixel electrode, the descriptions pertaining thereto will make reference to those of FIG. 4.

The second sub-pixel electrode PE2 and the second storage electrode 752 may overlap each other. For example, an edge portion of the second sub-pixel electrode PE2 may be disposed on the second storage electrode 752.

Meanwhile, although not illustrated, the pixel may further include a shielding electrode. The shielding electrode may be disposed on the capping layer 391 to overlap the data line DL. The shielding electrode may be formed of a material the same as that used to form the first sub-pixel electrode PE1. A common voltage may be applied to the shielding electrode.

As illustrated in FIGS. 3 and 5, the second source electrode SE2 may overlap the gate line GL more than the first source electrode SE1 does. That is, an overlapping area (hereinafter "second overlapping area") between the second source electrode SE2 and the gate line GL may be greater than an overlapping area (hereinafter "first overlapping area") between the first source electrode SE1 and the gate line GL in size. For example, the second overlapping area may be greater than the first overlapping area in size by about 10% to about 50%.

When the second overlapping area is greater than the first overlapping area, a parasitic capacitor (hereinafter, "second parasitic capacitor") between the gate electrode 412 and the second source electrode SE2 of the second thin film transistor TFT2 may become greater than a parasitic capacitor (hereinafter, "first parasitic capacitor") between the gate electrode 412 and the first source electrode SE1 of the first thin film transistor TFT1. This will be described further below with reference to FIG. 6.

Figure 6:
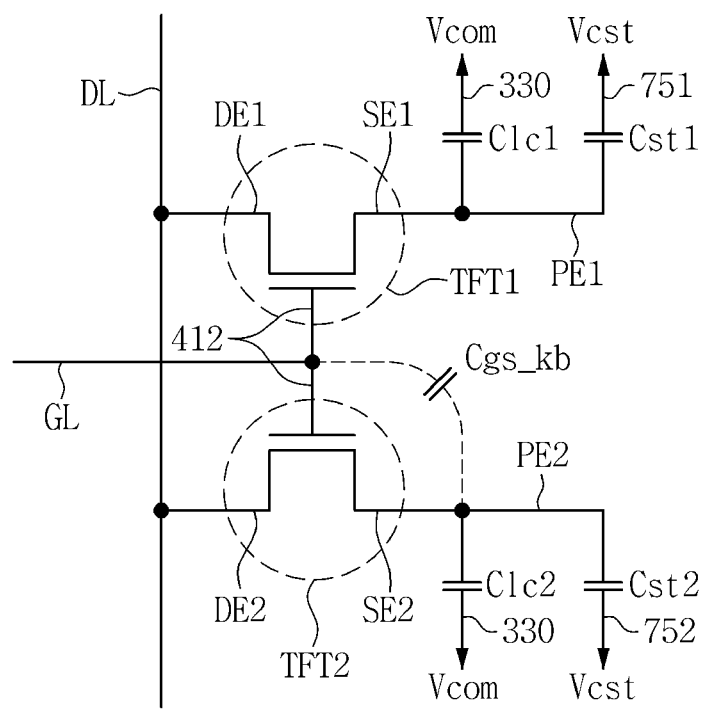
FIG. 6 is a circuit diagram illustrating an equivalent circuit of a pixel of FIG. 3.

FIG. 6 is a circuit diagram illustrating an equivalent circuit of a pixel of FIG. 3.

Each pixel, as illustrated in FIG. 6, may include a first thin film transistor TFT1, a first liquid crystal capacitor Clc1, a first storage capacitor Cst1, a second thin film transistor TFT2, a second liquid crystal capacitor Clc2, and a second storage capacitor Cst2.

The first thin film transistor TFT1 may be controlled by a gate signal applied from the gate line GL and may be connected between the data line DL and the first sub-pixel electrode PE1. The first thin film transistor TFT1 may be turned on by a gate high voltage of the gate signal and may apply a data signal applied from the data line DL to the first sub-pixel electrode PE1.

The first liquid crystal capacitor Clc1 may include the first sub-pixel electrode PE1 and the common electrode 330 opposed to each other. As described hereinabove, a common voltage Vcom may be applied to the common electrode 330.

The first storage capacitor Cst1 may include the first sub-pixel electrode PE1 and the first storage electrode 751 opposed to each other. As described hereinabove, a storage voltage Vcst may be applied to the first storage electrode 751. The storage voltage Vcst may have a voltage level equivalent to that of the common voltage.

The second thin film transistor TFT2 may be controlled by a gate signal applied from the gate line GL and may be connected between the data line DL and the second sub-pixel electrode PE2. The second thin film transistor TFT2 may be turned on by a gate high voltage of the gate signal and may apply a data signal applied from the data line DL to the second sub-pixel electrode PE2.

The second liquid crystal capacitor Clc2 may include the second sub-pixel electrode PE2 and the common electrode 330 opposed to each other.

The second storage capacitor Cst2 may include the second sub-pixel electrode PE2 and the second storage electrode 752 opposed to each other. As described hereinabove, a storage voltage Vcst may be applied to the second storage electrode 752. The storage voltage Vcst may have a voltage level equivalent to that of the common voltage.

The second parasitic capacitor Cgs_kb may be connected between the gate electrode 412 and the second source electrode SE2 of the second thin film transistor TFT2. As described hereinabove, when the second overlapping area is greater than the first overlapping area, the second parasitic capacitor Cgs_kb may have a greater capacitance than that of the first parasitic capacitor. Accordingly, a kickback voltage of the data signal applied to the second sub-pixel electrode PE2 may have a greater voltage level than that of a kickback voltage of the data signal applied to the first sub-pixel electrode PE1 When the gate signal decreases from a gate high voltage to a gate low voltage, being affected by the transition of the gate signal, the data signal of the sub-pixel electrode (the first sub-pixel electrode or the second sub-pixel electrode) may vary in accordance with the transition. Herein, the kickback voltage means an amount of variation of the data signal.

The above will be described further hereinbelow with the following Mathematical Formula, $$\Delta Vkb = \{C\_Cgs\_kb/(C\_Cgs\_kb + C\_Clc2 + C\_Cst2)\} \times \Delta Vg \quad \text{[Mathematical Formula]}$$

wherein $\Delta Vkb$ refers to the kickback voltage of the data signal applied to the second sub-pixel electrode PE2, C_Cgs_kb refers to the capacitance of the second parasitic capacitor Cgs_kb, C_Clc2 refers to the capacitance of the second liquid crystal capacitor Clc2, C_Cst2 refers to the capacitance of the second storage capacitor Cst2, and $\Delta Vg$ refers to a difference between a gate high voltage and a gate low voltage of the gate signal applied to the gate line GL.

According to the Mathematical Formula, as the capacitance of the second parasitic capacitor Cgs_kb increases, the kickback voltage $\Delta Vkb$ may increase as well. Since the capacitance of the second parasitic capacitor Cgs_kb is greater than that of the first parasitic capacitor, the kickback voltage $\Delta Vkb$ corresponding to the data signal applied to the second sub-pixel electrode PE2 is greater than the kickback voltage corresponding to the data signal applied to the first sub-pixel electrode PE1. Accordingly, although data signals having the same level are applied to the first and second sub-pixel electrodes PE1 and PE2, respectively, the data signal applied to the second sub-pixel electrode PE2 may maintain the level less than that of the data signal applied to the first sub-pixel electrode PE1, due to the kickback voltage difference. Accordingly, despite the absence of an additional voltage dividing transistor, which is conventionally provided, the level of the data signal applied to the second sub-pixel electrode PE2 may be controlled. Further, since the aforementioned voltage dividing transistor is not in use, an aperture ratio of the pixel may increase. In addition, since the voltage dividing transistor is not in use as described hereinabove, the data line and the storage electrode may not be directly connected, thereby efficiently reducing (i.e., minimizing) variation in the storage voltage.

Figure 7:
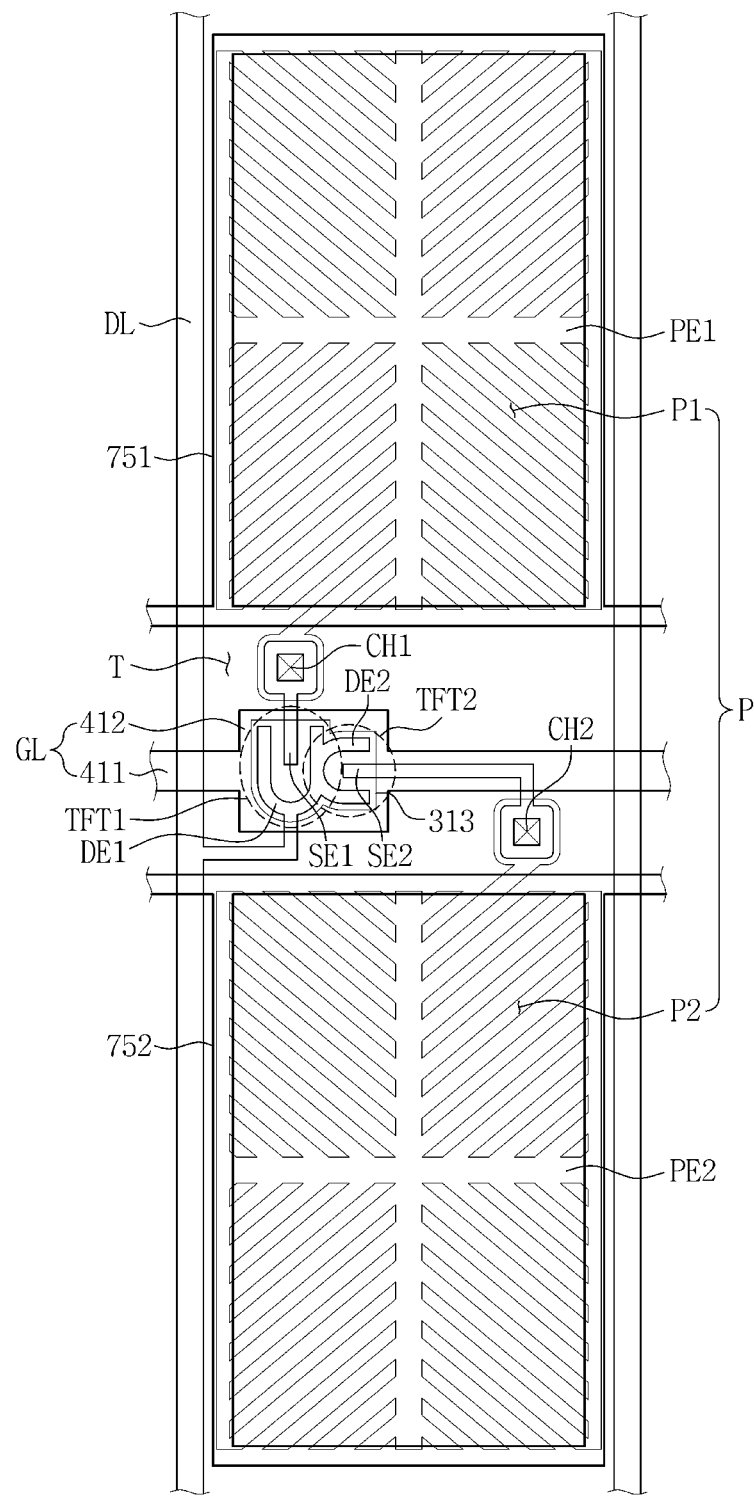
FIG. 7 is another detailed configuration view illustrating the pixel of FIG. 2.

FIG. 7 is another detailed configuration view illustrating the pixel of FIG. 2.

Referring to the pixel configuration of FIG. 7, a curved portion of a first drain electrode DE1 may be opposed to a second sub-pixel electrode PE2; and a curved portion of a second drain electrode DE2 may be opposed to a lateral surface of the first drain electrode DE1. For example, the first drain electrode DE1 may form a U-shape; and the second drain electrode DE2 may form a C-shape.

As illustrated in FIG. 7, an overlapping area between a first source electrode SE1 and a gate line GL (hereinafter "first overlapping area") may be different from an overlapping area between a second source electrode SE2 and the gate line GL (hereinafter "second overlapping area"). For example, the second overlapping area may be greater than the first overlapping area in size. In more particular, the second overlapping area may be greater than the first overlapping area in size by about 10% to about 50%.

Since configurations provided in the pixel illustrated in FIG. 7 are substantially identical to those provided in the pixel illustrated in FIGS. 3 and 4, descriptions pertaining to the configurations illustrated in FIG. 7 will make reference to the related descriptions of FIGS. 3 and 4.

Figure 8:
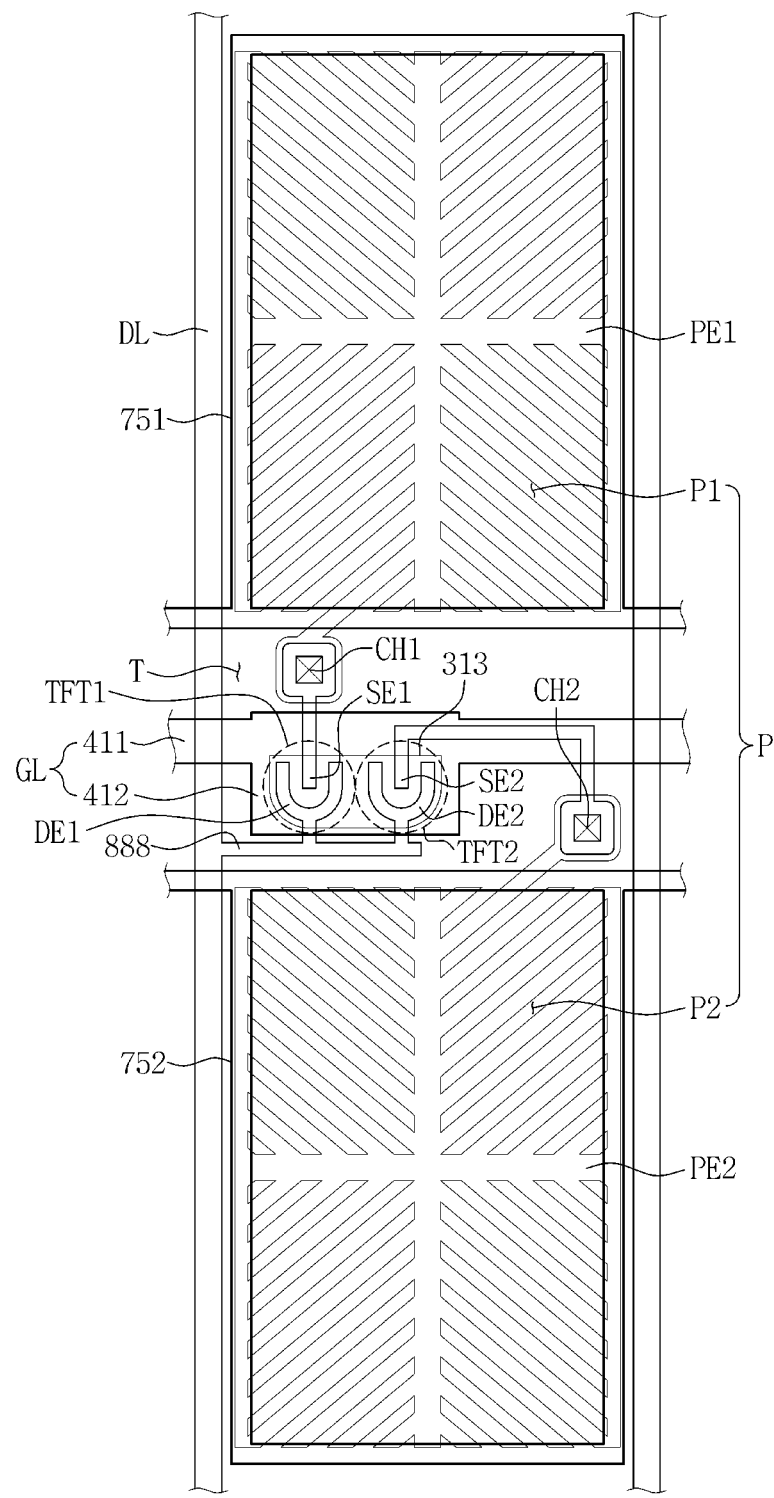
FIG. 8 is yet another detailed configuration view illustrating the pixel of FIG. 2.

FIG. 8 is yet another detailed configuration view illustrating the pixel of FIG. 2.

Referring to the pixel configuration of FIG. 8, a curved portion of a first drain electrode DE1 and a curved portion of a second drain electrode DE2 may be opposed to a second sub-pixel electrode PE2. For example, the first drain electrode DE1 and the second drain electrode DE2 may both form a U-shape. Herein, the curved portion of the first drain electrode DE1 and the curved portion of the second drain electrode DE2 may be connected to each other by a connecting electrode 888 extending from a data line DL. A side of the connecting electrode 888 may be connected to the data line DL, and another side of the connecting electrode 888 may be connected to the first drain electrode DE1 and the second drain electrode DE2.

As illustrated in FIG. 8, an overlapping area between a first source electrode SE1 and a gate line GL (hereinafter "first overlapping area") may be different from an overlapping area between a second source electrode SE2 and the gate line GL (hereinafter "second overlapping area"). For example, the second overlapping area may be greater than the first overlapping area in size. For example, the second overlapping area may be greater than the first overlapping area by about 10% to about 50%.

Since configurations provided in the pixel illustrated in FIG. 8 are substantially identical to those provided in the pixel illustrated in FIGS. 3 and 4, descriptions pertaining to the configurations illustrated in FIG. 8 will make reference to the related descriptions of FIGS. 3 and 4.

Figure 9:
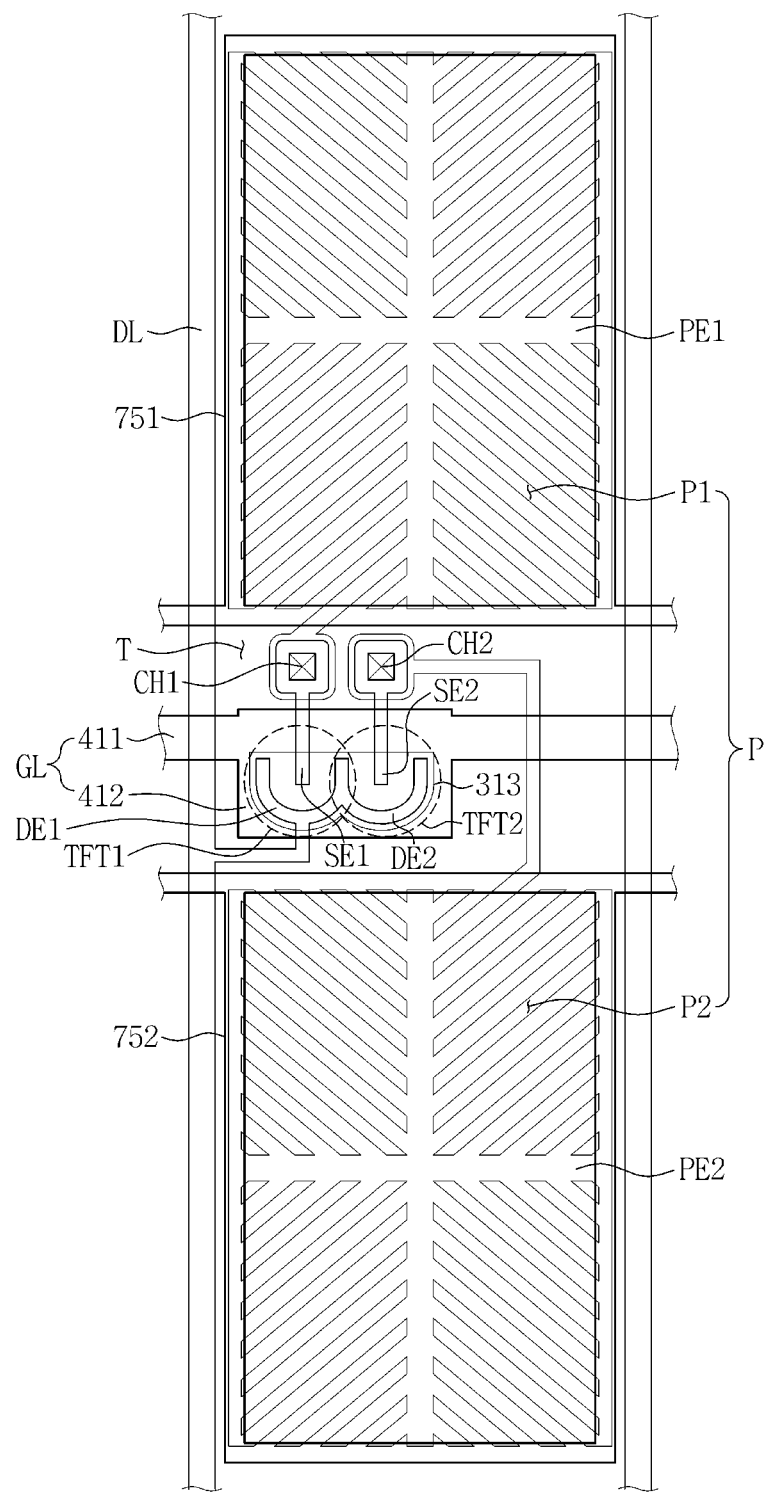
FIG. 9 is yet another detailed configuration view illustrating the pixel of FIG. 2.

FIG. 9 is yet another detailed configuration view illustrating the pixel of FIG. 2.

Referring to the pixel configuration of FIG. 9, a curved portion of a first drain electrode DE1 and a curved portion of a second drain electrode DE2 may be opposed to a second sub-pixel electrode PE2. For example, the first drain electrode DE1 and the second drain electrode DE2 may both form a U-shape. Herein, a lateral surface of the first drain electrode DE1 and a lateral surface of the second drain electrode DE2 may be connected to each other.

Further, referring to the pixel configuration of FIG. 9, a part of the second sub-pixel electrode PE2 may extend in a transistor area T to be connected to a second source electrode SE2.

As illustrated in FIG. 9, an overlapping area (hereinafter "first overlapping area") between the first source electrode SE1 and a gate line GL is different from an overlapping area (hereinafter "second overlapping area") between the second source electrode SE2 and the gate line GL. For example, the second overlapping area may be greater than the first overlapping area in size. For example, the second overlapping area may be greater than the first overlapping area by about 10% to about 50%.

Since configurations provided in the pixel illustrated in FIG. 9 are substantially identical to those provided in the pixel illustrated in FIGS. 3 and 4, descriptions pertaining to the configurations illustrated in FIG. 9 will make reference to the related descriptions of FIGS. 3 and 4.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. Various features of the above described and other embodiments can be mixed and matched in any manner, to produce further embodiments consistent with the invention.

What is claimed is:

1. A liquid crystal display (LCD) device comprising:
   a first substrate;
   a second substrate opposed to the first substrate;
   a liquid crystal layer between the first substrate and the second substrate;
   a gate line and a data line on the first substrate;
   a semiconductor layer overlapping the gate line;
   a first drain electrode overlapping the gate line and the semiconductor layer and connected to the data line;
   a first source electrode overlapping the gate line and the semiconductor layer;
   a first sub-pixel electrode connected to the first source electrode;
   a second drain electrode overlapping the gate line and the semiconductor layer and connected to the first drain electrode;
   a second source electrode overlapping the gate line and the semiconductor layer; and
   a second sub-pixel electrode connected to the second source electrode,
   wherein the second source electrode overlaps the gate line more than the first source electrode does, and
   wherein a level of data signal applied to the second sub-pixel electrode is lower than that of the data signal applied to the first sub-pixel electrode.

2. The LCD device of claim 1, wherein the second source electrode overlaps the gate line more than the first source electrode does by about 10% to about 50%.

3. The LCD device of claim 1, the gate line comprising an electrode portion and a line portion, each having different line widths.

4. The LCD device of claim 3, wherein the first drain electrode overlaps the electrode portion.

5. The LCD device of claim 3, wherein the second drain electrode overlaps the electrode portion.

6. The LCD device of claim 3, wherein the first source electrode overlaps the electrode portion.

7. The LCD device of claim 3, wherein the second source electrode overlaps the electrode portion and the line portion.

8. The LCD device of claim 3, wherein
   the second source electrode overlaps the electrode portion, and
   the second sub-pixel electrode overlaps the line portion.

9. The LCD device of claim 3, wherein the electrode portion has a line width greater than that of the line portion.

10. The LCD device of claim 1, wherein the first drain electrode and the second drain electrode each have a U-shape.

11. The LCD device of claim 10, wherein
    a curved portion of the first drain electrode is opposed to the second sub-pixel electrode, and
    a curved portion of the second drain electrode is opposed to the first sub-pixel electrode.

12. The LCD device of claim 10, wherein
    a curved portion of the first drain electrode is opposed to the second sub-pixel electrode, and
    a curved portion of the second drain electrode is opposed to a lateral surface of the first drain electrode.

13. The LCD device of claim 10, wherein a curved portion of the first drain electrode and a curved portion of the second drain electrode are opposed to the second sub-pixel electrode.

14. The LCD device of claim 1, further comprising a first storage electrode overlapping the first sub-pixel electrode.

15. The LCD device of claim 1, further comprising a second storage electrode overlapping the second sub-pixel electrode.

16. The LCD device of claim 1, wherein the first sub-pixel electrode has the same size as a size of the second sub-pixel electrode.

17. The LCD device of claim 1, the first sub-pixel electrode comprising:
    a first stem electrode; and
    a first branch electrode extending from the first stem electrode.

18. The LCD device of claim 1, the second sub-pixel electrode comprising:
    a second stem electrode; and
    a second branch electrode extending from the second stem electrode.

19. The LCD device of claim 1, wherein the second source electrode is arranged in a direction not parallel with the first source electrode.

20. The LCD device of claim 1, wherein the first source electrode is connected only to the first sub-pixel electrode, and the second source electrode is connected only to the second sub-pixel electrode.

* * * * *